(12) United States Patent
Medina et al.

(10) Patent No.: US 8,042,143 B2
(45) Date of Patent: Oct. 18, 2011

(54) APPARATUS AND METHOD FOR DISTRIBUTING MEDIA CONTENT

(75) Inventors: Douglas Medina, Grain Valley, MO (US); Nicholas Nicas, Blue Springs, MO (US); Frank Coppa, North Kansas City, MO (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 512 days.

(21) Appl. No.: 12/234,276

(22) Filed: Sep. 19, 2008

(65) Prior Publication Data

US 2010/0077440 A1    Mar. 25, 2010

(51) Int. Cl.
*H04N 7/173*    (2006.01)
(52) U.S. Cl. ... 725/118; 725/115; 725/141; 375/240.01; 375/240.27
(58) Field of Classification Search .................. 725/115, 725/141, 118; 375/240.01, 240.27
See application file for complete search history.

(56) References Cited

U.S. PATENT DOCUMENTS

| 6,137,539 | A  | * | 10/2000 | Lownes et al. | 348/569 |
| 6,184,935 | B1 | * | 2/2001  | Iaquinto et al. | 348/441 |
| 6,490,705 | B1 | * | 12/2002 | Boyce | 714/776 |
| 7,397,400 | B2 | * | 7/2008  | Miller | 341/67 |
| 2005/0163211 | A1 | * | 7/2005 | Shanableh | 375/240.1 |
| 2006/0109901 | A1 | * | 5/2006 | Ye et al. | 375/240.08 |
| 2006/0133355 | A1 | * | 6/2006 | Anschutz | 370/352 |
| 2008/0002580 | A1 | * | 1/2008 | Kawada et al. | 370/231 |
| 2008/0172593 | A1 | * | 7/2008 | Rainish et al. | 714/776 |
| 2008/0192119 | A1 | * | 8/2008 | Li et al. | 348/180 |

OTHER PUBLICATIONS

Advanced Television Systems Committee, ATSC Recommended Practice: E-VSB Implementation Guidelines, Apr. 18, 2006, Washington, DC 20006.

* cited by examiner

*Primary Examiner* — Pankaj Kumar
*Assistant Examiner* — Sahar A Baig
(74) *Attorney, Agent, or Firm* — Pablo Meles; Guntin Meles & Gust, PLC

(57) ABSTRACT

A system that incorporates teachings of the present disclosure may include, for example, a server having a controller to receive a digital signal representative of media content where the digital signal includes a main profile version of the media content and one or more lower profile versions of the media content and where the one or more lower profile versions have higher error correction than the main profile version, monitor the main profile version for an undesired condition that jeopardizes video continuity for a viewer of the media content, and transmit one of the one or more lower profile versions over an internet protocol television system to the viewer when the undesired condition is detected, where the transmission of the lower profile version to the viewer maintains video continuity for the viewer. Other embodiments are disclosed.

25 Claims, 8 Drawing Sheets

400

500

600

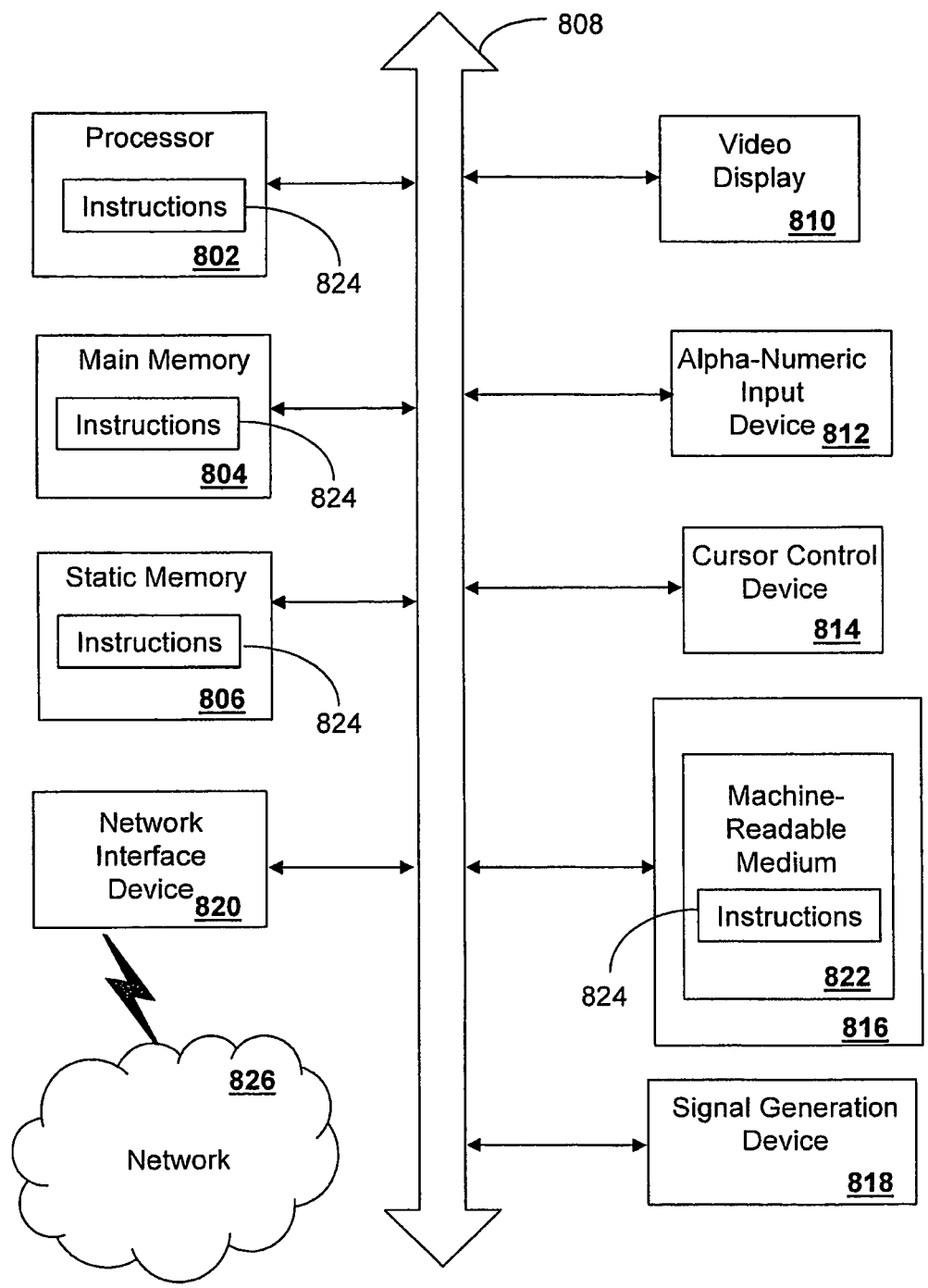
FIG. 8    800

APPARATUS AND METHOD FOR DISTRIBUTING MEDIA CONTENT

FIELD OF THE DISCLOSURE

The present disclosure relates generally to network communications and more specifically to an apparatus and method for distributing media content.

BACKGROUND

As communication networks continue to grow and provide more services over larger areas, viewers can sometimes experience undesired conditions during the presentation of media content. Error correction techniques have been employed to reduce undesired conditions in a video stream, such as the use of redundant data to address the issue of lost packets during transmission in a multicast environment as described in U.S. Publication No. 20080008167 to Ver Steeg. The Ver Steeg application also describes addressing the issue of lost packets through re-transmission requests sent by a receiver back to a sender which results in a unicast transmission of the missing packets to the receiver.

BRIEF DESCRIPTION OF THE DRAWINGS

FIG. 8 is a diagrammatic representation of a machine in the form of a computer system within which a set of instructions, when executed, may cause the machine to perform any one or more of the methodologies discussed herein.

DETAILED DESCRIPTION

Figure 1:
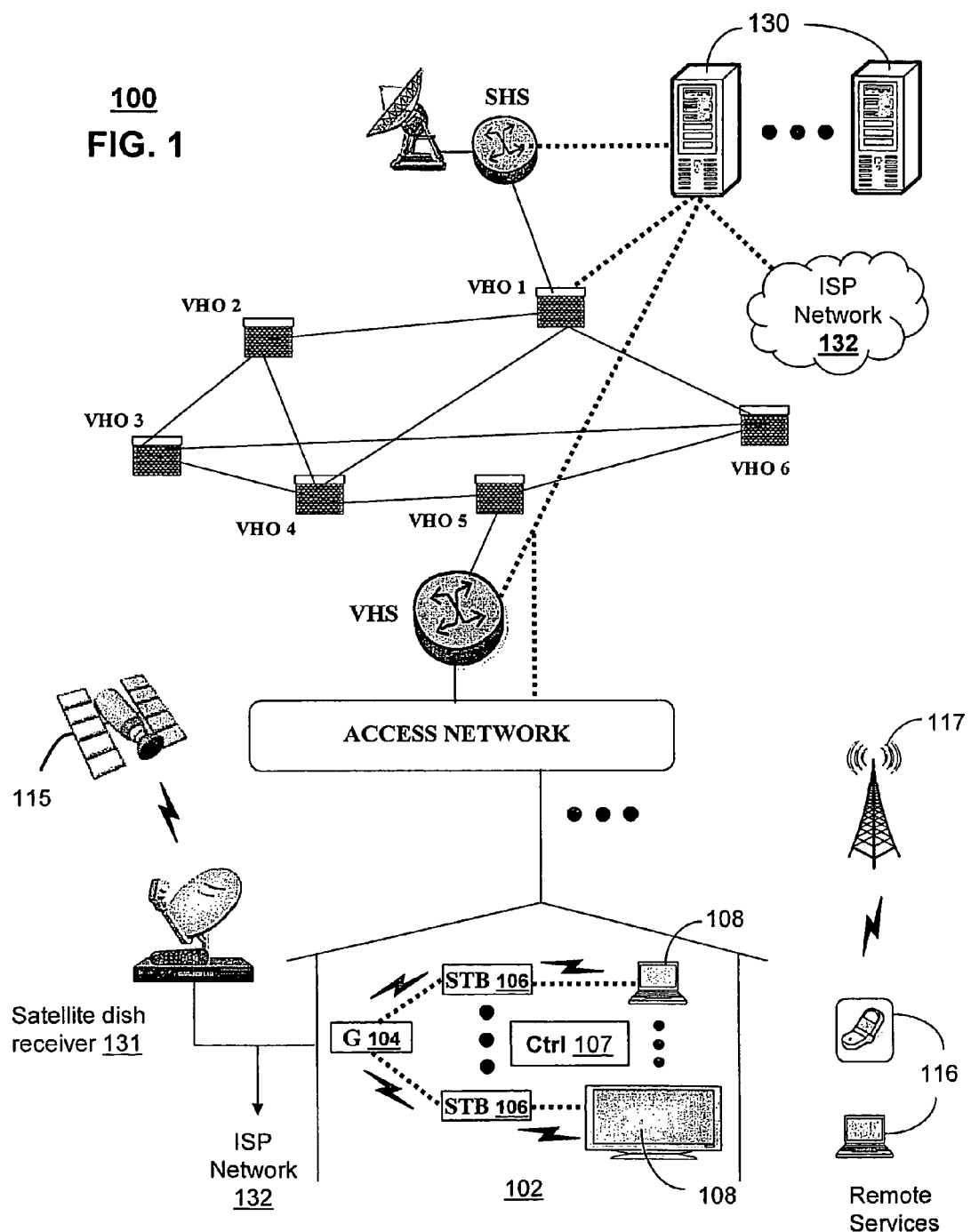
FIGS. 1-3 depict illustrative embodiments of communication systems that provide media services.

One embodiment of the present disclosure entails computer-readable storage medium, having computer instructions for receiving a digital terrestrial signal representative of media content where the digital terrestrial signal includes a main profile version of the media content and lower profile versions of the media content where the lower profile versions have a lower resolution and more forward error correction data than the main profile version, monitoring the main profile version for an undesired condition that jeopardizes video continuity for a viewer of the media content, selecting one of the lower profile versions when the undesired condition is detected, and transmitting the selected one of the lower profile versions over an internet protocol television system to the viewer, wherein the transmission of the selected one of the lower profile versions to the viewer maintains video continuity for the viewer.

Another embodiment of the present disclosure entails a server having a controller to receive a digital terrestrial signal representative of media content where the digital terrestrial signal includes a main profile version of the media content and one or more lower profile versions of the media content and where the one or more lower profile versions have higher error correction than the main profile version, monitor the digital terrestrial signal for an undesired condition that jeopardizes video continuity for a viewer of the media content, and select a media version from one of the main profile version and the one or more lower profile versions for transmission over an internet protocol television system to the viewer based at least in part on the monitoring of the digital terrestrial signal for the undesired condition.

Yet another embodiment of the present disclosure entails a server having a controller to receive a digital signal representative of media content where the digital signal includes a main profile version of the media content and one or more lower profile versions of the media content and where the one or more lower profile versions have higher error correction than the main profile version, monitor the main profile version for an undesired condition that jeopardizes video continuity for a viewer of the media content, and transmit one of the one or more lower profile versions over an internet protocol television system to the viewer when the undesired condition is detected, wherein the transmission of the lower profile version to the viewer maintains video continuity for the viewer.

Yet another embodiment of the present disclosure entails a server having a controller to obtain media content, generate a digital terrestrial signal representative of the media content where the digital terrestrial signal includes a main profile version of the media content and one or more lower profile versions of the media content and where the one or more lower profile versions have a lower resolution and higher error correction than the main profile version, and transmit the digital terrestrial signal to a network element of an internet protocol television system, where the digital terrestrial signal is monitored for an undesired condition that jeopardizes video continuity for a viewer of the media content, where a media version is selected from one of the main profile version and the one or more lower profile versions for transmission to the viewer based on the monitoring of the digital terrestrial signal for the undesired condition.

Yet another embodiment of the present disclosure entails a method including receiving a digital signal representative of media content where the digital signal includes a main profile version of the media content and one or more lower profile versions of the media content and where the one or more lower profile versions have a lower resolution and more forward error correction data than the main profile version, monitoring the digital signal for an undesired condition that jeopardizes video continuity for a viewer of the media content, and selecting a media version from the main profile version and the one or more lower profile versions for transmission over an internet protocol television system to the viewer based on the monitoring of the digital signal.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network, such as a local area network (LAN), to commercial and/or residential buildings 102 housing a gateway 104, such as a residential gateway or RG. The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107, such as an infrared or RF remote control. Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices or servers 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services, such as GSM, CDMA, UMTS, WiMAX, etc. In one embodiment, the servers 130 can include detectors for monitoring received media content for faults. As an example, the servers or detectors 130 can monitor a main profile of media content being received from a broadcast studio, including directly and/or indirectly, for faults and can switch to a lower profile version of the media content that is provided with the broadcast signal, such as over a Studio-Transmitter Link (STL). In another embodiment, the lower profile version of the media content can be part of a terrestrial broadcast signal and can have a lower resolution and/or higher error correction data, such as more Forward Error Correction (FEC) symbols in the data stream. The present disclosure also contemplates the servers 130 being positioned and configured in other ways. For example, the detectors can be multiple detectors distributed throughout the system 100, including through use of a distributed configuration and/or a master/slave arrangement. As another example, the detectors can be located with other network elements of the communication system 100, including service provider equipment and/or Customer Premises Equipment (CPE).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
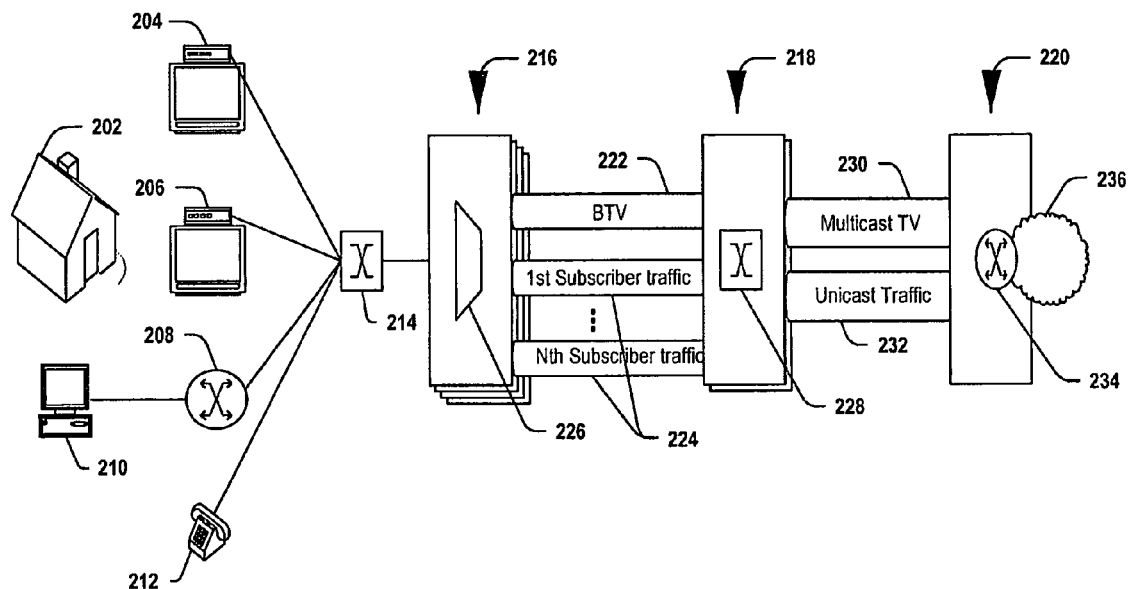

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
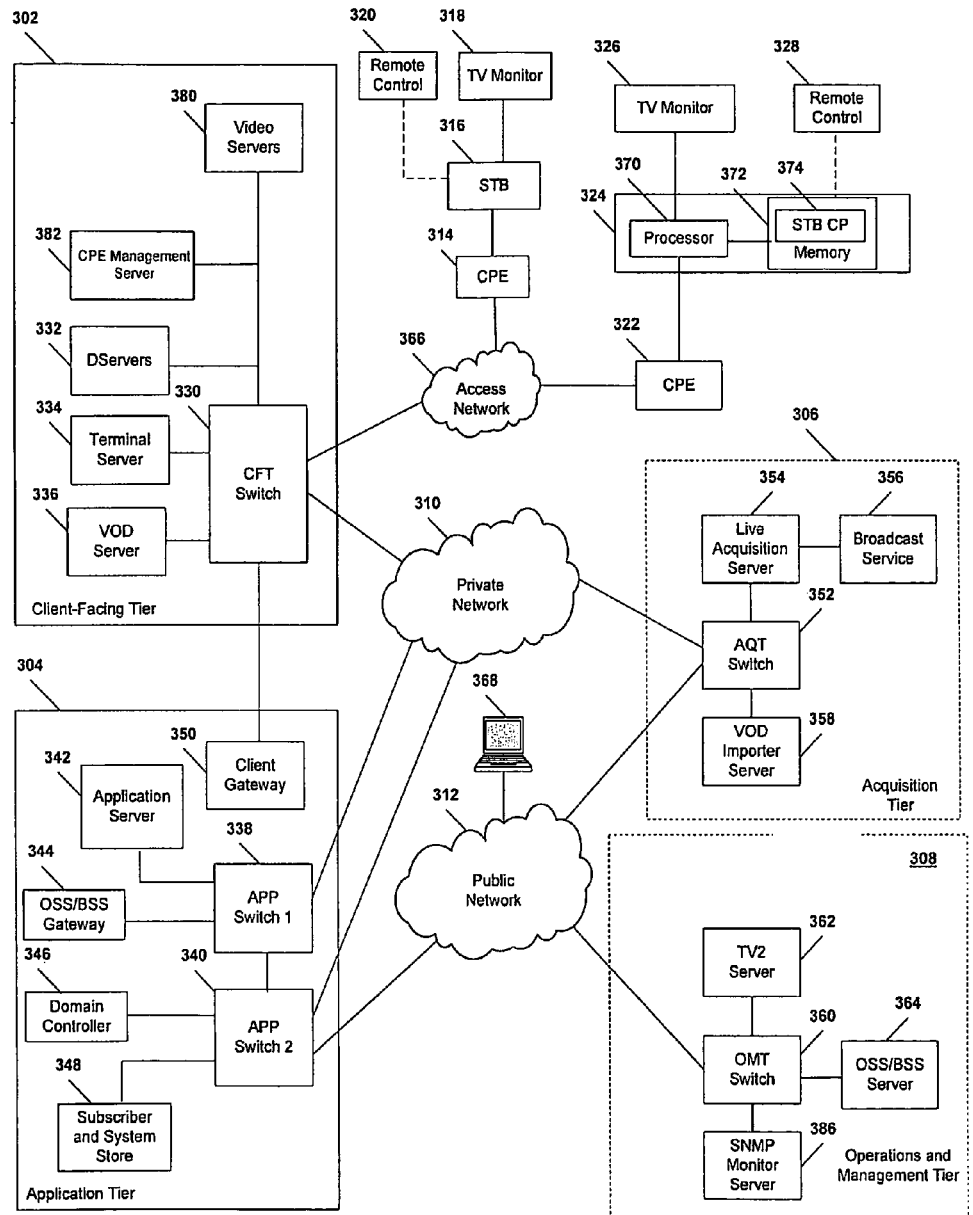

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, CPE 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, such as because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors

318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
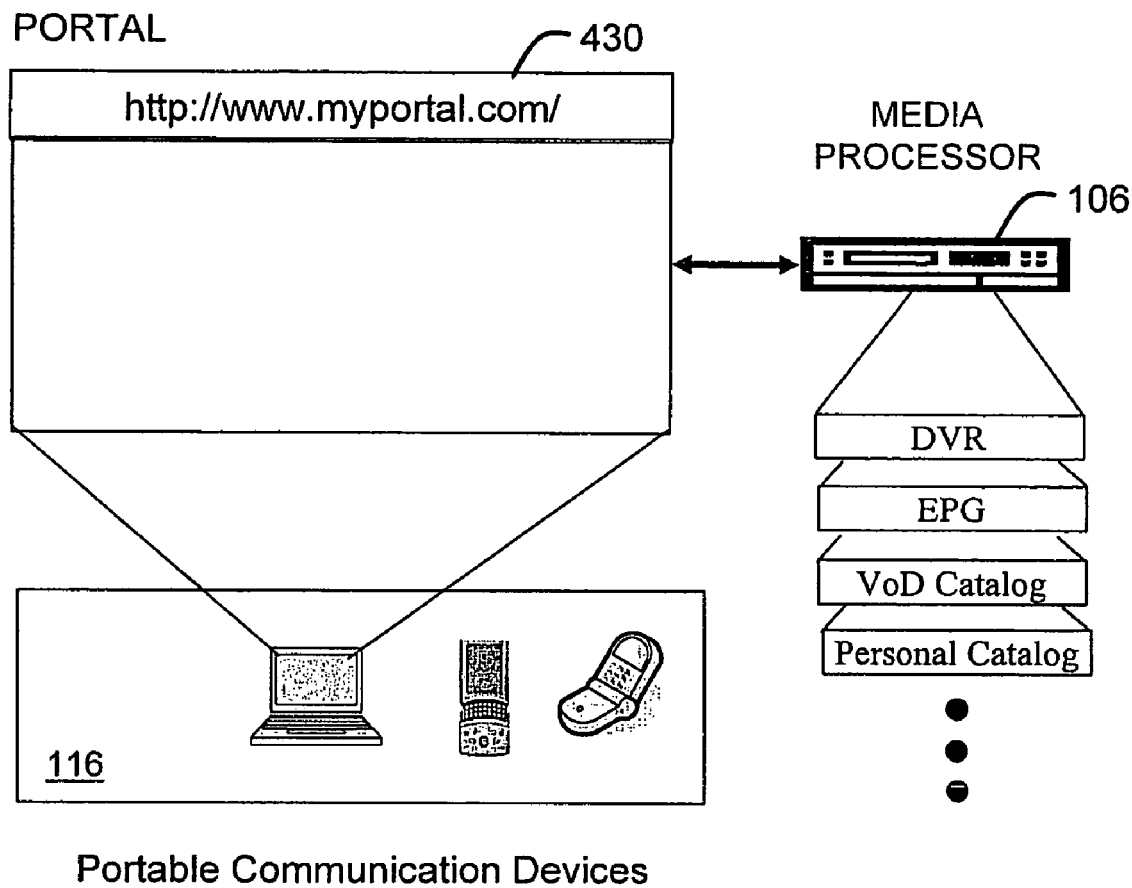
FIG. 4 depicts an illustrative embodiment of a portal interacting with at least one among the communication systems of FIGS. 1-3.

FIG. 4 depicts an illustrative embodiment of a portal 430. The portal 430 can be used for managing services of communication systems 100-400. The portal 430 can be accessed by a Uniform Resource Locator (URL) with a common Internet browser such as Microsoft's Internet Explorer using an Internet-capable communication device such as references 108, 116, or 210 of FIGS. 1-2. The portal 430 can be configured to access a media processor such as references 106, 204, 206, 316, and 324 of FIGS. 1-3 and services managed thereby such as a Digital Video Record&r (DVR), an Electronic Programming Guide (EPG), VoD catalog, a personal catalog stored in the STB, such as personal videos, pictures, audio recordings, and so on.

Figure 5:
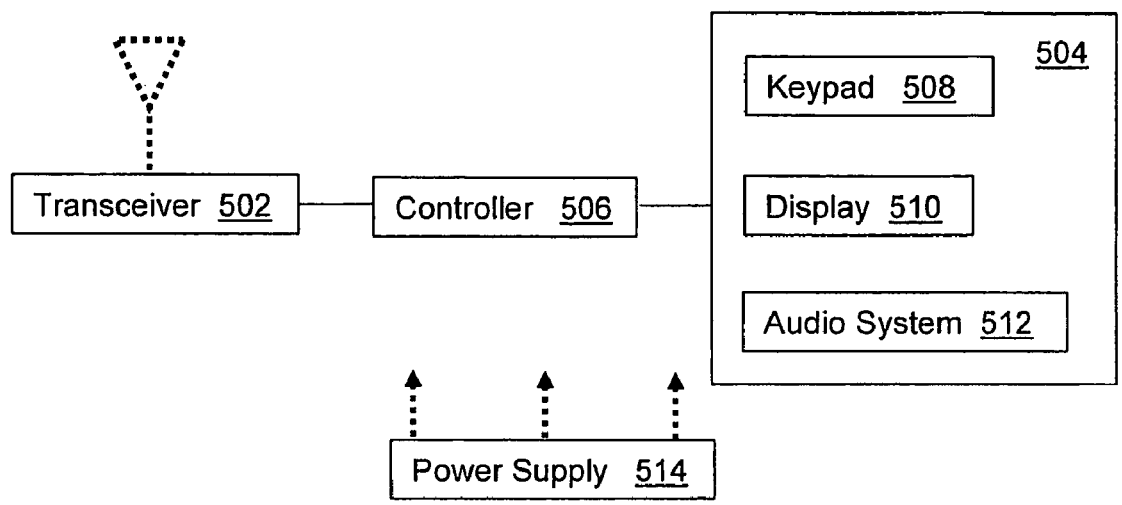
FIG. 5 depicts an illustrative embodiment of a communication device utilized in the communication systems of FIGS. 1-3.

FIG. 5 depicts an exemplary embodiment of a communication device 500. Communication device 500 can be a representative portion of any of the aforementioned communication devices of FIGS. 1-4. The communication device 504 can comprise a wireline and/or wireless transceiver 502 (herein transceiver 502), a user interface (UI) 504, a power supply 514, and a controller 506 for managing operations thereof. The transceiver 502 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 502 can also support common wireline access technologies such as circuit-switched wireline access technologies, packet-switched wireline access technologies, or combinations thereof. PSTN can represent one of the common circuit-switched wireline access technologies. VoIP and IP data communications can represent some of the commonly available packet-switched wireline access technologies. The transceiver 502 can also be adapted to support IP Multimedia Subsystem (IMS) protocol for interfacing to an IMS network that can combine PSTN and VoIP communication technologies.

The UI 504 can include a depressible or touch-sensitive keypad 508 and a navigation mechanism such as a roller ball, joystick, and/or navigation disk for manipulating operations of the communication device 500. The UI 504 can further include a display 510 such as monochrome or color LCD (Liquid Crystal Display), OLED (Organic Light Emitting Diode) or other suitable display technology for conveying images to the end user of the communication device 500. In an embodiment where the display 51 0 is touch-sensitive, a portion or all of the keypad 508 can be presented by way of the display. The UI 504 can also include an audio system 512 that utilizes common audio technology for conveying low volume audio, such as audio heard only in the proximity of a human ear, and high volume audio, such as speakerphone for hands free operation. The audio system 512 can further include a microphone for receiving audible signals of an end user.

The power supply 514 can utilize common power management technologies such as replaceable and rechargeable batteries, supply regulation technologies, and charging system technologies for supplying energy to the components of the communication device 500 to facilitate long-range or short-range portable applications. The controller 506 can utilize computing technologies such as a microprocessor and/or digital signal processor (DSP) with associated storage memory such a Flash, ROM, RAM, SRAM, DRAM or other storage technologies.

Figure 6:
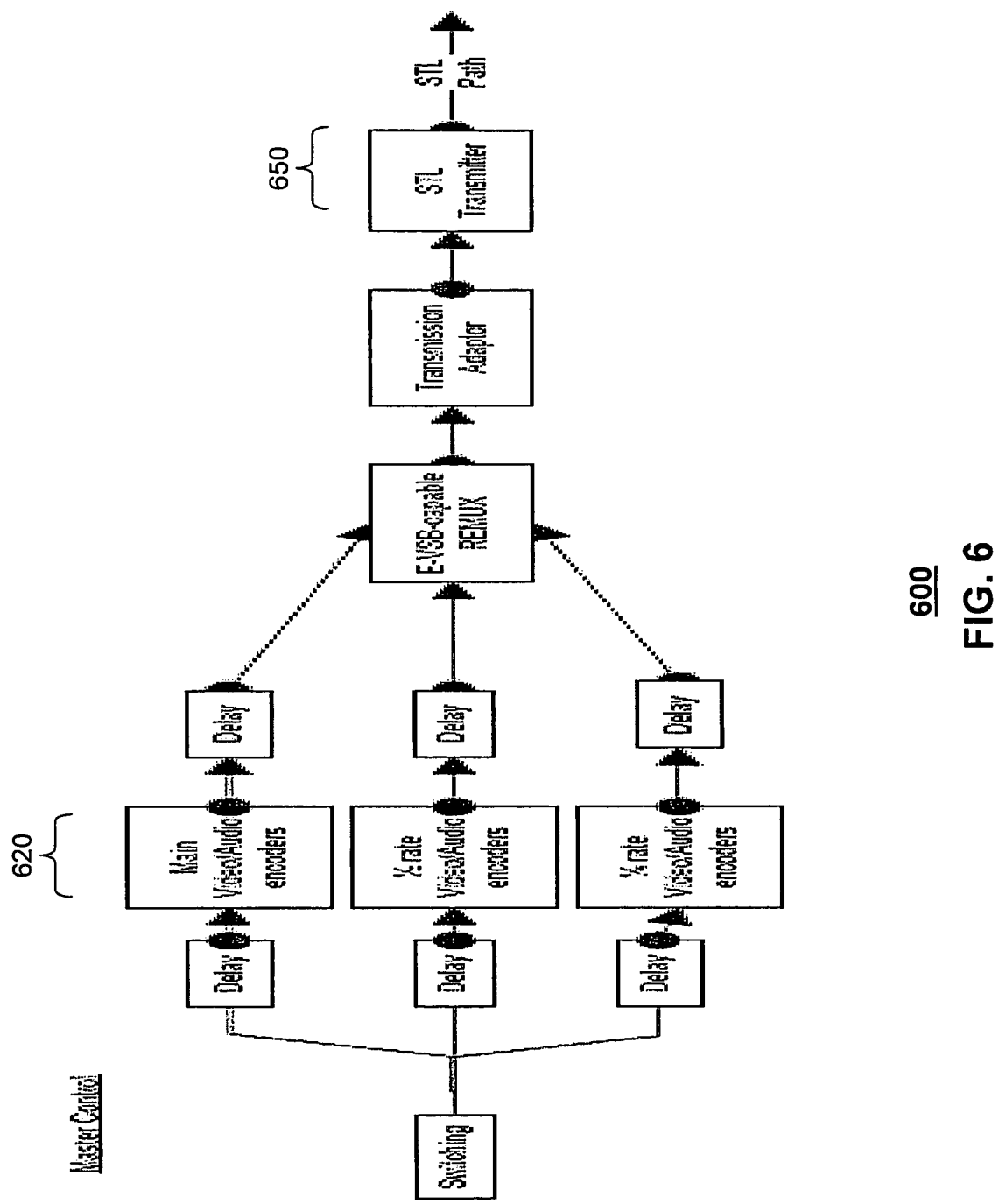
FIG. 6 depicts an illustrative embodiment of a network element utilized in the communication systems of FIGS. 1-3.

FIG. 6 depicts an exemplary embodiment of a network element 600 that can be used for generating one or more lower profile versions of a main profile of media content. The element 600 can include a plurality of encoders 620 for embedding code in the multiplex to develop lower profile copies. In one embodiment, the lower profile copies have lower resolution and higher error correction data, such as more FEC symbols in the data stream. In another embodiment, the main profile of the media content can be generated in MPEG-2 format while the lower profiles can be generated in H264 and/or VC1 format. The particular number of lower profile versions of the media content and the particular resolution and/or amount of error correction data can vary. In another embodiment, video scaling techniques can be employed so that the lower profile versions of the media content do not have a direct correlation to the MPEG-2 format of the main profile. The element 600 can also include an STL transmitter 650 for providing the media content, including the main profile and one or more lower profile versions, to the VHO or other service provider equipment for distribution to viewers.

Figure 7:
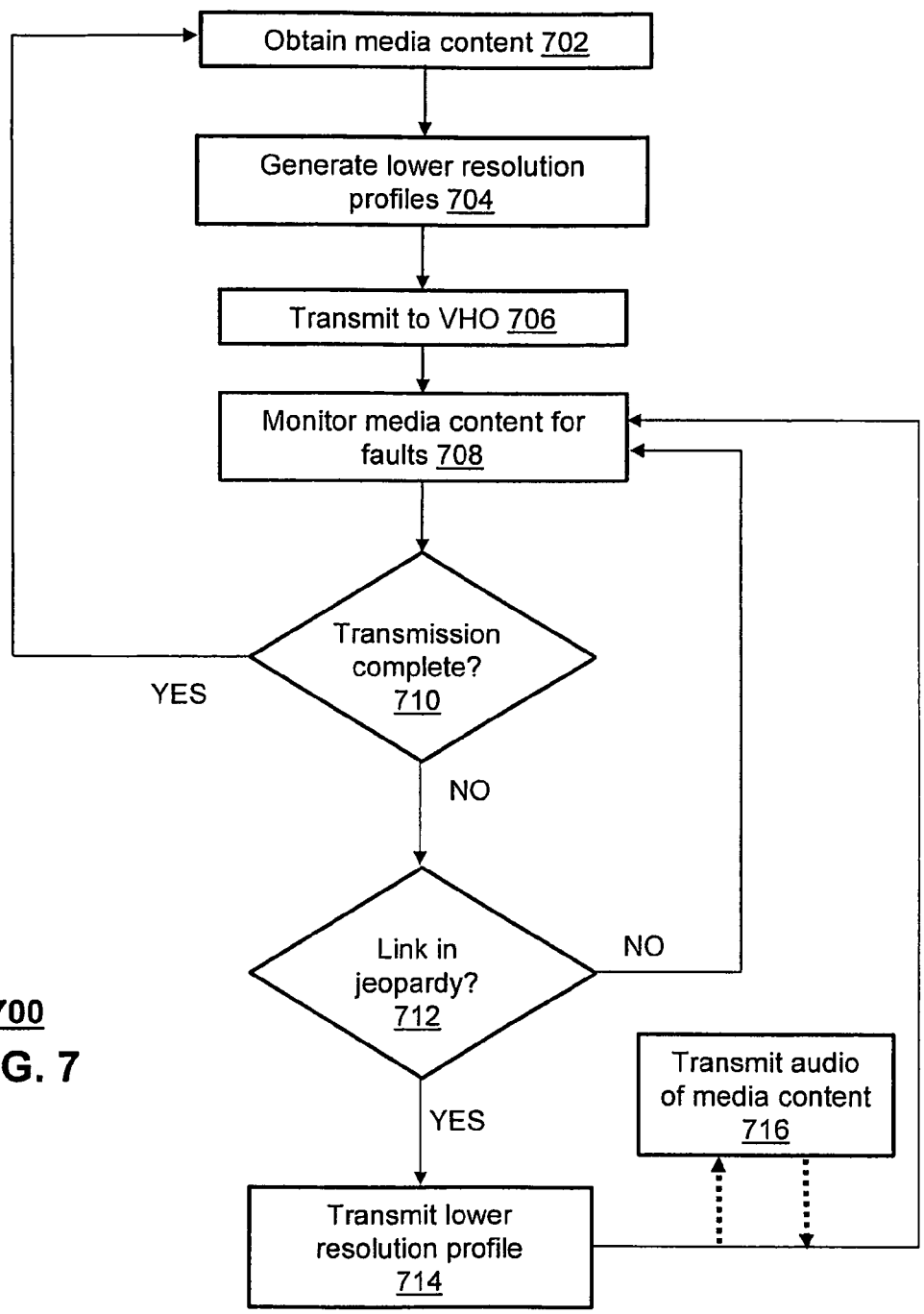
FIG. 7 depicts an illustrative embodiment of a method operating in portions of the communication systems of FIGS. 1-3.

FIG. 7 depicts an exemplary method 700 operating in portions of one or more of the communication systems 100-400. Method 700 has variants as depicted by the dashed lines. It would be apparent to an artisan with ordinary skill in the art that other embodiments not depicted in FIG. 7 are possible without departing from the scope of the claims described below.

Method 700 can begin with step 702 where a broadcast studio or other entity obtains media content, such as through capturing the media content. In step 704, the media content can be processed for generating lower profile versions in addition to the main profile. In one embodiment, the lower profile versions of the media content can be generated from the main profile. In another embodiment, the main profile and lower profile versions of the media content can be generated from another signal, such as an analog signal, and multiplexed for transmission to a service provider.

For instance, signal processing can be applied according to an Advanced Television Systems Committee standard (ATSC), such as the mobile handheld standard, so that code is embedded in the multiplex which develops lower profile versions of the main profile. In one embodiment, the standard can be based on or related to the ATSC Recommended Practice: E-VSB Implementation Guidelines, document ATSC A/112, which is the ATSC standards related to E-VSB (Enhanced Vestigial Sideband modulation), and provides guidelines to parameter selection and implementation scenarios; the disclosure of which is incorporated herein by reference.

In step 706, the media content with main and lower profile versions can be provided to the service provider, such as through transmission over the STL path to the SHS and to the VHO. The STL path can be a wired and/or wireless links, including using a terrestrial signal for transporting the media content with main and lower profile versions. The service provider can distribute the main profile of the media content to viewers, such as through multicast protocol or other distribution techniques including VoD. In step 708, the server or detector 130 can monitor the main profile for faults. In step 710, method 700 can determine if the media content transmission is complete. If the transmission is complete then method 700 can return to step 702 to obtain more media content, such as scheduled programming, movies, VOD, and so forth. If on the other hand the transmission is on-going then in step 712, the server 130 can determine if the link to a viewer, such as the PID lock, is in jeopardy of being lost or otherwise losing synchronization or continuity of the video.

If the link is not in jeopardy then method 700 can return to step 708 to continue to monitor for faults in the main profile that would result in the link being in jeopardy. If on the other hand the link is in jeopardy then in step 714 the server 130 can provide the viewers with a lower profile version of the media content which has a lower resolution but higher error correction data in order to maintain the link. The particular error correction technique utilized can vary and can include FEC, such as block coding, convolution coding, concatenate coding, turbo coding and so forth. Method 700 can then return to step 708 to continue to monitor for faults in the main profile that would result in the link being in jeopardy.

In one embodiment, server 130 can determine whether a threshold has been reached such that an audio-only signal is to be transmitted to the viewer. The threshold for presenting an audio-only signal can be determined dynamically, such as based on the type of media content which may need a higher resolution for viewer satisfaction or based on viewer satisfaction data of a resolution for viewers in a particular region. In another embodiment, an image or slide indicating technical difficulty can be presented with the audio-only signal. In one embodiment, the technical difficulty image can include information regarding the problem being experienced or other parameters related to presenting the media content. For example, metric data can be provided to the STB for presentation with the technical difficulty image, such as available resolution, expected time until the video of the media content will again be presented, and so forth.

The present disclosure contemplates the server 130 extracting, or otherwise switching to, one or more of the lower profile versions of the media content when the main profile is experiencing faults that jeopardize the continuity of the video presentation. In one embodiment, the server 130 can determine which of a group of lower profile versions of the media content should be distributed to one or more viewers. The determination can be based on a number of factors, including the amount of faults and/or the type of faults detected which jeopardize the video continuity for the viewer.

In another embodiment, the main and lower profiles of the media content and the capability to switch therebetween to maintain video continuity for the viewer, can be utilized as a secondary signal and can be employed where a primary signal has faulted. The present disclosure contemplates server 130 or other monitoring devices detecting faults or other undesired conditions in the primary signal and in the secondary signal, and switching to the lower resolution versions of the media content to maintain the video continuity for the viewer.

Upon reviewing the aforementioned embodiments, it would be evident to an artisan with ordinary skill in the art that said embodiments can be modified, reduced, or enhanced without departing from the scope and spirit of the claims described below. For example, the server 130 can receive feedback, such as through monitoring being performed at set top boxes receiving the media content. Based on the feedback, the servers 130 can determine whether to transmit one of the lower profile versions of the media content. In one embodiment, the feedback can be based on information inputted from one or more viewers through their STB's and transmitted back to the server 130.

In one embodiment, the presenting of a lower profile version of the media content to a viewer, such as for VoD, can be based on a user profile and/or monitored behavior of the user. For example, a user profile can designate a fault threshold for switching to the lower profile version of the media content and/or can designate a lower limit of resolution before presenting an audio-only signal. As another example, viewer behavior can be monitored, such as through data captured by the STB and transmitted to the server 130, to determine a fault threshold for switching to the lower profile version of the media content and/or to determine a lower limit of resolution before presenting an audio-only signal. For instance, a history of switching off media content with a particular amount of discontinuity and/or resolution can be monitored.

In another embodiment, the server 130 can continue to monitor the received signal having the main and lower profiles for a reduction or elimination of the undesired conditions that would cause video discontinuity for the viewer and can transmit a higher resolution version of the media content, including the main profile, when the undesired condition has dissipated. For instance, the server can detect faults above a pre-determined threshold and transmit a lower profile of the media content and then can transmit the main profile once the detected faults are no longer above the threshold.

Other suitable modifications can be applied to the present disclosure without departing from the scope of the claims below. Accordingly, the reader is directed to the claims section for a fuller understanding of the breadth and scope of the present disclosure.

FIG. 8 depicts an illustrative diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected, such as using a network, to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802, such as a central processing unit (CPU), a graphics processing unit (GPU, or both, a main memory 804 and a static memory 806, which communicate with each other via a bus 808. The computer system 800 may further include a video display unit 810, such as a liquid crystal display (LCD), a flat panel, a solid state display, or a cathode ray tube (CRT). The computer system 800 may include an input device 812, such as a keyboard, a cursor control device 814, such as a mouse, a disk drive unit 816, a signal generation device 818, such as a speaker or remote control, and a network interface device 820.

The disk drive unit 816 may include a computer-readable medium 822 on which is stored one or more sets of instructions, such as software 824, embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the computer-readable medium 822 is shown in an example embodiment to be a single medium, the term "computer-readable medium" should be taken to include a single medium or multiple media, such as a centralized or distributed database, and/or associated caches and servers, that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission, such as TCP/IP, UDP/IP, HTML, HTTP represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions for:
   receiving a digital terrestrial signal representative of media content, the digital terrestrial signal comprising a main profile version of the media content and lower profile versions of the media content, the lower profile versions having a lower resolution and more Forward Error Correction (FEC) data than the main profile version;
   monitoring the main profile version for an undesired condition that jeopardizes video continuity for a viewer of the media content;
   selecting one of the lower profile versions when the undesired condition is detected; and
   transmitting the selected one of the lower profile versions over an internet protocol television system to the viewer, wherein the transmission of the selected one of the lower profile versions to the viewer maintains video continuity for the viewer.

2. The non-transitory computer-readable storage medium of claim 1, comprising computer instructions for:
   monitoring the selected one of the lower profile versions for the undesired condition;
   selecting another one of the lower profile versions when the undesired condition is detected; and
   transmitting the selected another one of the lower profile versions over the internet protocol television system to the viewer, wherein the transmission of the selected another one of the lower profile versions to the viewer maintains the video continuity for the viewer.

3. The non-transitory computer-readable storage medium of claim 2, comprising computer instructions for determining a minimum resolution threshold for the viewer and transmitting an audio-only signal when available ones of the lower profile versions that maintain the video continuity for the viewer have a resolution below the minimum resolution threshold.

4. The non-transitory computer-readable storage medium of claim 1, wherein the main profile version is MPEG-2 format and the lower profile versions are at least one of H264 and VC1 formats.

5. The non-transitory computer-readable storage medium of claim 1, wherein the FEC data comprises at least one of block coding, convolution coding, concatenate coding and turbo coding.

6. The non-transitory computer-readable storage medium of claim 1, wherein the digital terrestrial signal is generated using at least one of enhanced vestigial sideband modulation, advanced vestigial sideband modulation, and mobile-pedestrian-handheld modulation.

7. The non-transitory computer-readable storage medium of claim 1, wherein at least one of the monitoring of the main profile version for the undesired condition and the selecting of the one of the lower profile versions is based on at least one of a user profile and monitored behavior associated with the viewer.

8. A server comprising a controller to:
   receive a digital terrestrial signal representative of media content, the digital terrestrial signal comprising a main profile version of the media content and one or more lower profile versions of the media content, the one or more lower profile versions having higher error correction than the main profile version;
   monitor the digital terrestrial signal for an undesired condition that jeopardizes video continuity for a viewer of the media content; and
   select a media version from one of the main profile version and the one or more lower profile versions for transmission over an internet protocol television system to the viewer based at least in part on the monitoring of the digital terrestrial signal for the undesired condition.

9. The server of claim 8, wherein transmission of the selected media version to the viewer maintains video continuity for the viewer.

10. The server of claim 8, wherein the controller is adapted to select the media version based in part on a user profile associated with the viewer.

11. The server of claim 8, wherein the controller is adapted to select the media version based in part on monitored behavior associated with the viewer.

12. The server of claim 8, wherein the error correction is forward error correction comprising at least one of block coding, convolution coding, concatenate coding, and turbo coding.

13. The server of claim 8, wherein the controller is adapted to determine a minimum resolution threshold for the viewer and transmit an audio-only signal when available ones of the lower profile versions have a resolution below the minimum resolution threshold.

14. The server of claim 8, wherein the controller is adapted to select another media version from the one or more lower profile versions for transmission over the internet protocol television system to the viewer based at least in part on the monitoring of the digital terrestrial signal for the undesired condition, wherein the selected another media version has a lower resolution and higher error correction than the transmitted media version.

15. A server comprising a controller to:
   receive a digital signal representative of media content, the digital signal comprising a main profile version of the media content and one or more lower profile versions of the media content, the one or more lower profile versions having higher error correction than the main profile version;
   monitor the main profile version for an undesired condition that jeopardizes video continuity for a viewer of the media content; and
   transmit one of the one or more lower profile versions over an internet protocol television system to the viewer when the undesired condition is detected, wherein the transmission of the lower profile version to the viewer maintains video continuity for the viewer.

16. The server of claim 15, wherein the one or more lower profile versions are a plurality of lower profile versions, and wherein the controller is adapted to select the transmitted lower profile version from among the plurality of lower profile versions based on at least one of a user profile associated with the viewer, monitored behavior of the viewer and monitoring of the digital signal.

17. The server of claim 16, wherein the controller is adapted to determine a minimum resolution threshold for the viewer and transmit an audio-only signal when available ones of the lower profile versions have a resolution below the minimum resolution threshold.

18. The server of claim 15, wherein the digital signal is a digital terrestrial signal generated using at least one of enhanced vestigial sideband modulation, advanced vestigial sideband modulation, and mobile-pedestrian-handheld modulation.

19. The server of claim 15, wherein the error correction is forward error correction comprising at least one of block coding, convolution coding, concatenate coding, and turbo coding.

20. A server comprising a controller to:
obtain media content;
generate a digital terrestrial signal representative of the media content, the digital terrestrial signal comprising a main profile version of the media content and one or more lower profile versions of the media content, the one or more lower profile versions having a lower resolution and higher error correction than the main profile version; and
transmit the digital terrestrial signal to a network element of an internet protocol television system, the digital terrestrial signal being monitored for an undesired condition that jeopardizes video continuity for a viewer of the media content,
wherein a media version is selected from one of the main profile version and the one or more lower profile versions for transmission to the viewer based on the monitoring of the digital terrestrial signal for the undesired condition.

21. A method, comprising:
receiving a digital signal representative of media content, the digital signal comprising a main profile version of the media content and one or more lower profile versions of the media content, the one or more lower profile versions having a lower resolution and more forward error correction data than the main profile version;
monitoring the digital signal for an undesired condition that jeopardizes video continuity for a viewer of the media content; and
selecting a media version from the main profile version and the one or more lower profile versions for transmission over an internet protocol television system to the viewer based on the monitoring of the digital signal.

22. The method of claim 21, comprising transmitting the media version to the viewer and maintaining the video continuity for the viewer.

23. The method of claim 21, comprising:
monitoring the selected media version for the undesired condition;
selecting another media version based on the monitoring of the selected media version; and
transmitting the selected another media version over the internet protocol television system to the viewer, wherein the transmission of the selected another media version to the viewer maintains the video continuity for the viewer.

24. The method of claim 21, comprising transmitting an audio-only signal to the viewer.

25. The method of claim 21, wherein the digital signal is a digital terrestrial signal generated using at least one of enhanced vestigial sideband modulation, advanced vestigial sideband modulation, and mobile-pedestrian-handheld modulation.

* * * * *